US011165805B2

(12) United States Patent
Davis, III et al.

(10) Patent No.: US 11,165,805 B2
(45) Date of Patent: *Nov. 2, 2021

(54) GUARD SYSTEM FOR AUTOMATIC NETWORK FLOW CONTROLS FOR INTERNET OF THINGS (IOT) DEVICES

(71) Applicant: International Business Machines Corporation, Armonk, NY (US)

(72) Inventors: Charles K. Davis, III, Denver, CO (US); Chris Dotson, Lexington, KY (US); Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/457,948

(22) Filed: Jun. 29, 2019

(65) Prior Publication Data

US 2019/0327256 A1    Oct. 24, 2019

Related U.S. Application Data

(63) Continuation of application No. 15/934,931, filed on Mar. 23, 2018.

(51) Int. Cl.
*H04L 29/06* (2006.01)

(52) U.S. Cl.
CPC ...... *H04L 63/1425* (2013.01); *H04L 63/0876* (2013.01); *H04L 63/1483* (2013.01)

(58) Field of Classification Search
CPC ............. H04L 63/1425; H04L 63/0876; H04L 63/1483; H04L 29/06; H04L 29/1232; H04L 29/12264
See application file for complete search history.

(56) References Cited

U.S. PATENT DOCUMENTS

| 10,911,906 B2* | 2/2021 | Kane ................... H04L 67/1097 |
| 2011/0154440 A1* | 6/2011 | De Graaf ............ H04L 63/0892 726/3 |
| 2015/0195126 A1 | 7/2015 | Vasseur et al. |

(Continued)

*Primary Examiner* — Ashokkumar B Patel
*Assistant Examiner* — William B Jones
(74) *Attorney, Agent, or Firm* — Jeffrey S. LaBaw; David H. Judson (57) ABSTRACT

A method, apparatus and computer program product for use in identifying and blocking operation of compromised or potentially compromised IoT device(s) on a network, such as a local network behind a router or firewall. To this end, the technique provides for automated and seamless on-boarding of a "guard" system for IoT devices, preferably as those devices join (or re-join) into the network via a Dynamic Host Configuration Protocol message exchange. In operation, and in response to receipt of a DHCP discover message that includes a network location, a DHCP server uses the network location to locate and retrieve a set of flow attributes for the device. Those attributes are then associated with the IP address to be assigned to the IoT device in a network control device. The network control device then selectively identifies and/or blocks operation of the IoT device when the IoT device is compromised or potentially compromised, thereby protecting the network (or network resources) from damage or misuse.

8 Claims, 3 Drawing Sheets

(56) References Cited

U.S. PATENT DOCUMENTS

| | | | |
|---|---|---|---|
| 2015/0256385 A1* | 9/2015 | Chandhok | H04L 41/18 |
| | | | 715/734 |
| 2016/0072831 A1* | 3/2016 | Rieke | G06F 3/04842 |
| | | | 726/1 |
| 2016/0212099 A1 | 7/2016 | Zou et al. | |
| 2016/0261465 A1 | 9/2016 | Gupta et al. | |
| 2016/0352766 A1 | 12/2016 | Flacher et al. | |
| 2017/0006454 A1 | 1/2017 | Salkintzis | |
| 2017/0039501 A1 | 2/2017 | Deguchi | |
| 2017/0171778 A1 | 6/2017 | Britt et al. | |
| 2017/0342741 A1 | 11/2017 | Holland et al. | |
| 2019/0349426 A1* | 11/2019 | Smith | H04L 67/104 |

* cited by examiner

GUARD SYSTEM FOR AUTOMATIC NETWORK FLOW CONTROLS FOR INTERNET OF THINGS (IOT) DEVICES

BACKGROUND

Technical Field

This disclosure relates generally to information processing and, in particular, to managing an Internet of Things (IoT) device.

Background of the Related Art

IoT is the network of physical objects embedded with electronics, sensors, software, and connectivity to enable the exchange of data with other connected devices over a data communication infrastructure according to a standard or specification. It is contemplated within IoT that devices such as refrigerators, thermostats, lighting appliances, vending machines, access-control devices, peripherals, a variety of mobile devices, and many other devices in everyday use (collectively referred to hereinafter as "device" or "IoT device"), will be able to communicate and interoperate with each other using such an infrastructure. As IoT becomes ubiquitous, however, many of these devices have been subverted for nefarious purposes, e.g., to reveal an owner's private information (data exfiltration), to participate in Internet attacks (such as Distributed Denial-of-Service) without the knowledge or consent of their owners, and the like. The problem of a compromised IoT device is especially acute in small-to-midsize networks that sit behind network control devices, such as network firewalls or routers, and that serve to connect the network to the publicly-routed Internet.

BRIEF SUMMARY

The subject matter herein describes a method, apparatus and computer program product for use in identifying and blocking operation of compromised or potentially compromised IoT device(s) on a network, such as a local network behind a router or firewall. To this end, the technique provides for automated and seamless on-boarding of a "guard" system for IoT devices, preferably as those devices join (or re-join) into the network. This system is sometimes referred to herein as an IoT guard. Once the IoT guard is in place for a particular IoT device, it selectively identifies and/or blocks operation of the IoT device when the device is compromised or potentially compromised, thereby protecting the network (or network resources) from damage.

To implement the IoT guard for a particular device, the technique of this disclosure preferably leverages a network management protocol used to dynamically assign IoT (and other) devices Internet Protocol (IP) addresses and network configuration parameters. In a typical use case herein, the network management protocol is the Dynamic Host Configuration Protocol (DHCP). To this end, and in one embodiment, an IoT device participates in a DHCP IP address lease acquisition interaction with a DCHP server in an attempt to acquire an IP address for itself. This known technique is then extended or augmented to facilitate implementation of the IoT guard for that device. In particular, the IoT device preferably is pre-configured with knowledge of a network location (typically on the public Internet) at which information about expected behaviors and flows for the device may be obtained. During the DHCP message exchange (the IP address lease acquisition) between the IoT device and the DHCP server, the server queries the network location, fetches the network behaviors and flows that have been defined for the device, and then uses that information to configure a network control device (such as a router/firewall) to monitor the IoT device against that information. Typically, the network control device is configured by associating the information with an IP address that is (or will be) assigned for the IoT device in connection with a DHCP IP address lease acquisition. In this manner, the network control device is configured dynamically with the information that the IoT manufacturer (or other supplier) deems to represent a normal or expected behavior for the IoT device. Thereafter, and as the IoT device generates or receives network flows (or attempts to do so), the network control device compares those flows against the network flow control information it has for the IoT device to monitor for anomalous behavior associated with the IoT device. Based on these comparisons, the network control device then takes one or more configured or predefined action(s) (e.g., issuing a notification or alert, blocking access to the network, etc.) when the network control device determines that the IoT device is or may be compromised.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
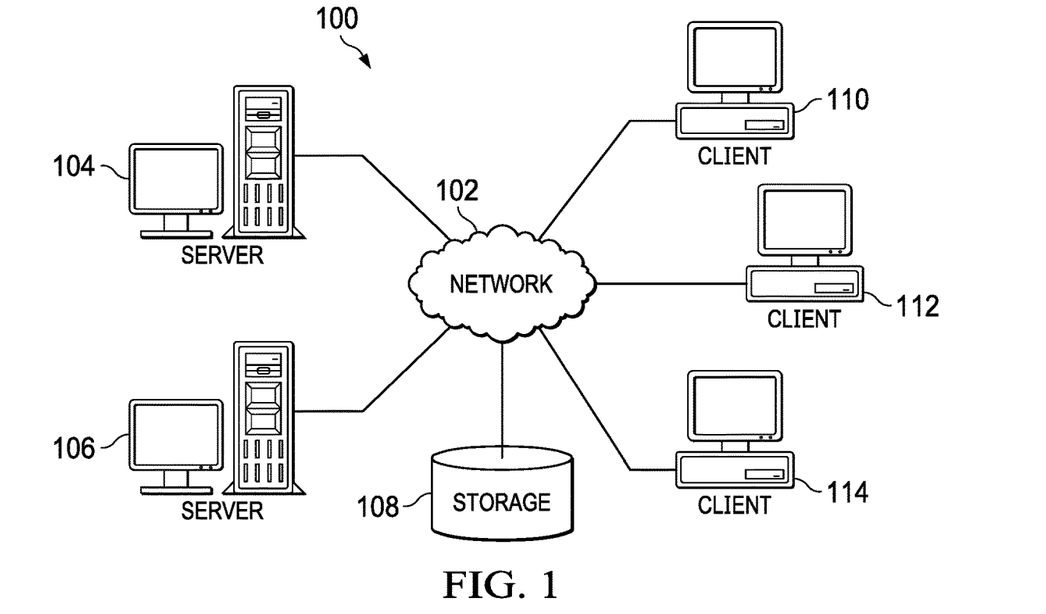
FIG. 1 depicts an exemplary block diagram of a distributed data processing environment in which exemplary aspects of the illustrative embodiments may be implemented.
Figure 2:
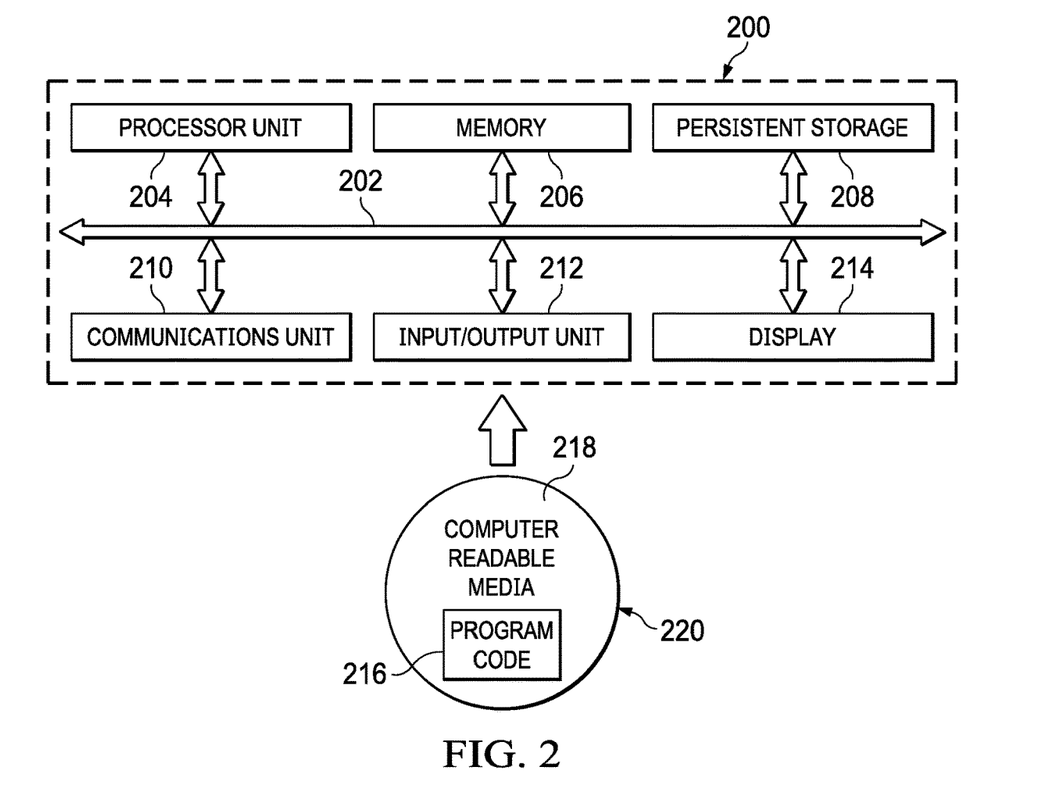
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java$^{TM}$, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of further background, the Dynamic Host Configuration Protocol (DHCP) is a network management protocol used on TCP/IP networks (such as the client-server network in FIG. 1) whereby a DHCP server dynamically assigns an IP address and other network configuration parameters to each device on a network so they can communicate with other IP networks. A DHCP server enables computers to request IP addresses and networking parameters automatically from a service provider, such as an Internet Service Provider (ISP), thereby reducing the need for manually assignment of IP addresses. DHCP operations typically include server discovery, IP lease offer, IP lease request, and IP lease acknowledgement. The DHCP operation begins with a client broadcasting a request, which is known as a discover message. The discover message is a request to lease an IP address, and it comprises a number of fields (e.g., IP addresses, client hardware address, etc.), and one or more DHCP options that are varying length octet strings. Various DHCP options are defined as an Internet standard in RFC 2132. When a DHCP server receives a discover message from a client, the DHCP server reserves an IP address for the client and makes a lease offer. The lease offer is embodied in an offer message, which contains the client's MAC address, an IP address being offered by the server, a subnet mask, a lease duration, and the server's IP address. In response, the client replies with a DHCP message, known as a DHCP request, that requests the offered IP address. When the DHCP server receives the request message from the client, the server sends back a message packet, which is known as an acknowledgement message, and that includes the lease duration and other configuration information. In this manner, the DHCP server automatically or dynamically assigning IP addresses to the client.

Internet of Things

The "Internet of Things" refers to the network of physical objects or "things" that are embedded with and/or otherwise include electronics, software, sensors, and Internet-accessible network connectivity that allow these objects to collect and exchange data. Due to the increase in physical devices with network connectivity capabilities, the IoT is growing rapidly. In the IoT, sensors/devices of many different types and capabilities are deployed for different purposes. These sensors/devices communicate using different protocols/methods, and they require correspondingly different interfaces to manage. These devices are manufactured by many different manufacturers and, as a consequence, have different and quite varied sets of operating characteristics. FIG. 2 is representative of computing device functionality that may be leveraged in an IoT device.

Figure 3:
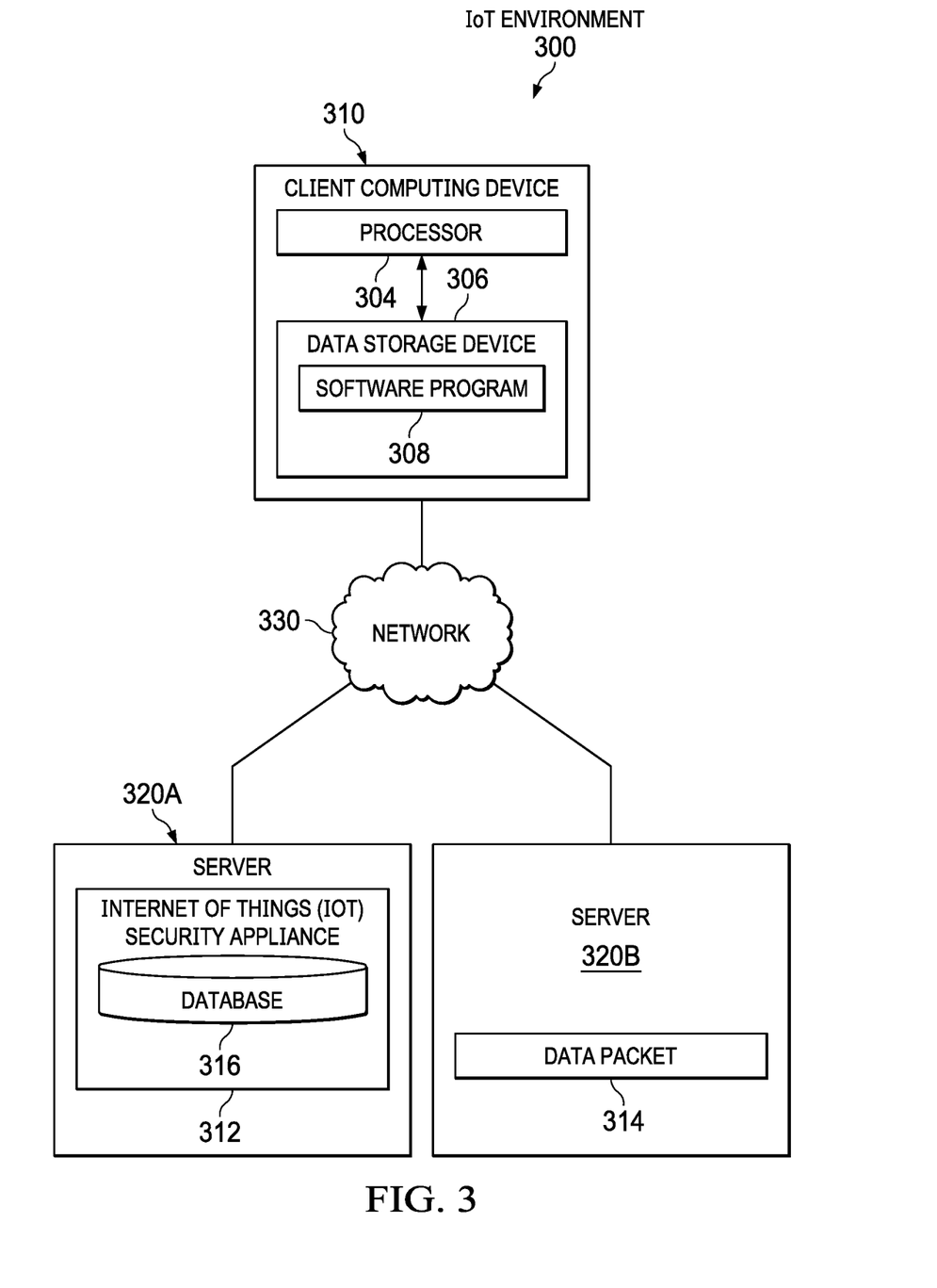
FIG. 3 illustrates a simplified IoT networking environment in which the techniques of this disclosure may be practiced.

Referring to FIG. 3, an exemplary IoT networked computer environment 300 is depicted, according to at least one embodiment. As in FIG. 1, the networked computer environment 100 includes a client computing device 310 and a server 320A, 320B interconnected via a communication network 330. According to at least one implementation, the networked computer environment 300 may include a plurality of client computing devices 310, only one of which is shown for illustrative brevity. The networked computer environment 300 may also include a plurality of servers 320A, 320B, only two of which are shown for illustrative brevity. The communication network 330 may include various types of communication networks, such as a wide area network (WAN), local area network (LAN), a telecommunication network, a wireless network, a public switched network and/or a satellite network. The communication network 330 may include connections, such as wire, wireless communication links, or fiber optic cables. Of course, it should be appreciated that FIG. 3 provides only an illustration of one implementation and does not imply any limitations with regard to the environments in which different embodiments may be implemented. Many modifications to the depicted environments may be made based on design and implementation requirements.

As was depicted in FIG. 2, the client computing device 310 includes a processor 304 and a data storage device 306 that is enabled to host and run a software program 308 and communicate with the server 320A, 320B via the communication network 330. In at least one embodiment, the client computing device 310 is an IoT device. Typically, an IoT device includes various components, such as a listener, a broadcaster, a recorder, and a sensing/actuation component. In general, the listener serves to receive data or other input via the communication network, while the broadcaster serves to broadcast data or other output via the network. The sensing/actuation component undertakes sensing and actuation functions conventionally associated with IOT devices. Generally, the sensing/actuation component may serve to undertake sensing or measurement of ambient parameters, such as temperature, brightness, sound, etc., as may be appropriate in the context of the device. The recorder serves to log data.

The server computer 320A, 320B may be a laptop computer, netbook computer, personal computer (PC), a desktop computer, or any programmable electronic device or any network of programmable electronic devices capable of hosting and running an IoT security appliance 312 and a data packet 314 and communicating with the client computing device 310 via the communication network 330. The server 320A, 320B may also operate in a cloud computing service model, such as Software as a Service (SaaS), Platform as a Service (PaaS), or Infrastructure as a Service (IaaS). The server 320A, 320B may also be located in a cloud computing deployment model, such as a private cloud, community cloud, public cloud, or hybrid cloud.

In a typical embodiment, the IoT security appliance 312 is a program capable of scanning an incoming data packet 314 through original signature-based and/or behavior-based patterns to detect data leaks. To this end, the IoT security appliance 312 may contain a data repository, such as database 316, to store existing IoT images, such as those received from a manufacturer, or those otherwise manually imported by a user.

Network Flow Control of IoT Devices

By way of additional background, it is assumed that one or more IoT manufacturers (or other providers) publish, at their own web site(s), and/or at a common industry site, and/or through a third party, the "flow attributes" associated with a particular IoT device that is sourced from the manufacturer, the manufacturer's representative or other proxy. These flow attributes represent a set of network characteristics that the manufacturer (or some other entity), for example, considers to represent "normal" behavior of the IoT device. The set of network characteristics of course will vary based on the type and purpose of the IoT device. Representative network characteristics include, without limitation: whether or not the device sends/receives data using encryption, whether or not the device performs cleartext Data Loss Prevention (DLP) checks, the nature of the device's bandwidth requirements and anticipated use, anticipated communication frequency, anticipated communication volume, information associated with the device's recommended network address and port assignments, information associated with the protocol(s) utilized by the device, other specific device capabilities (e.g., processing time, memory requirements, etc.), device capability types, generic device capability and use, and so forth.

To provide a more concrete example, representative communication flow behaviors may include one or more of the following: transport protocol (e.g., UDP, TCP, etc.), session protocol (e.g., FTP, SFTP, HTTP, etc.), anticipated message sequence (e.g., IoT device sends 2 TCP messages, receives 3, sends 2, receives 1, . . . , etc.), each message's attributes (e.g., message 1 from/to address, from/to port number, message size, message checksum, message 2, . . . , etc.), message rate, message time-of-day, message header description, message payload description (e.g., first 16 bytes is the device's unique identifier, . . . , etc.), MAC addresses (as MAC addresses are assigned to specific manufacturers, which in turn may be identified as an IoT manufacture), etc.

Other network flow(s) may be defined by specific types of connections per identified ports to identified destination addresses, or specific flow and connection semantics (e.g., initiate TCP connection outbound on port 2525 to target URL, followed by receive TCP connection inbound within two (2) minutes after having sent a TCP connection to port 2525, from the target URL, etc.). The specific flow semantics may be even further defined (more fine-grained), such as by linking the above-identified connection semantics to further constraints on the amount of data or data rate that may be sent (e.g., no more than 1 KB/sec), the packet type, the specific nature of a byte sequence, and so forth.

The above-identified flow attribute examples are merely representative.

Guard System for Automatic Network Flow Controls for IoT Devices

With the above as background, the technique of this disclosure are now described. Generally, the technique provides for automated and seamless on-boarding of a "guard" system for IoT devices, preferably as those devices join (or re-join) into a network. This system is sometimes referred to herein as an IoT guard. Once the guard system is in place for a particular IoT device, it selectively identifies and/or blocks certain operation of the IoT device when the device is found to be compromised or potentially compromised, thereby protecting the network (or network resources) from damage.

To implement the IoT guard for a particular device, the technique of this disclosure preferably leverages a network management protocol that is used to dynamically assign IoT (and other) devices Internet Protocol (IP) addresses and network configuration parameters so that the devices can communicate with other IP networks. In a typical use case herein, the network management protocol is the Dynamic Host Configuration Protocol (DHCP). To this end, and in one embodiment, an IoT device participates in a DHCP IP address lease acquisition interaction with a DCHP server in an attempt to acquire an IP address for itself. This known technique is then extended or augmented as described herein to facilitate implementation of the IoT guard for that device. To that end, the IoT device preferably is pre-configured with knowledge of a network location (typically on the public Internet) at which information about expected behaviors and flows for the device may be obtained. During the DHCP message exchange (the IP address lease acquisition) between the IoT device and the DHCP server, the server queries the network location, fetches the network behaviors and flows that have been defined for the device, and then uses that information to configure a network control device (such as a router/firewall) to monitor the IoT device against that information. Typically, and as will be described below, the network control device is configured by associating the information with an IP address that is (or will be) assigned for the IoT device in connection with a DHCP IP address lease acquisition. In this manner, the network control device is configured dynamically with the information that the IoT manufacturer (or other supplier) deems to represent a normal or expected behavior for the IoT device. Thereafter, and as the IoT device generates or receives network flows (or attempts to do so), the network control device compares those flows against the network flow control information it has for the IoT device to monitor for anomalous behavior associated with the IoT device. Based on these comparisons, the network control device then takes one or more configured or predefined action(s) (e.g., issuing a notification or alert, blocking access to the network, etc.) when the network control device determines that the IoT device is or may be compromised.

Figure 4:
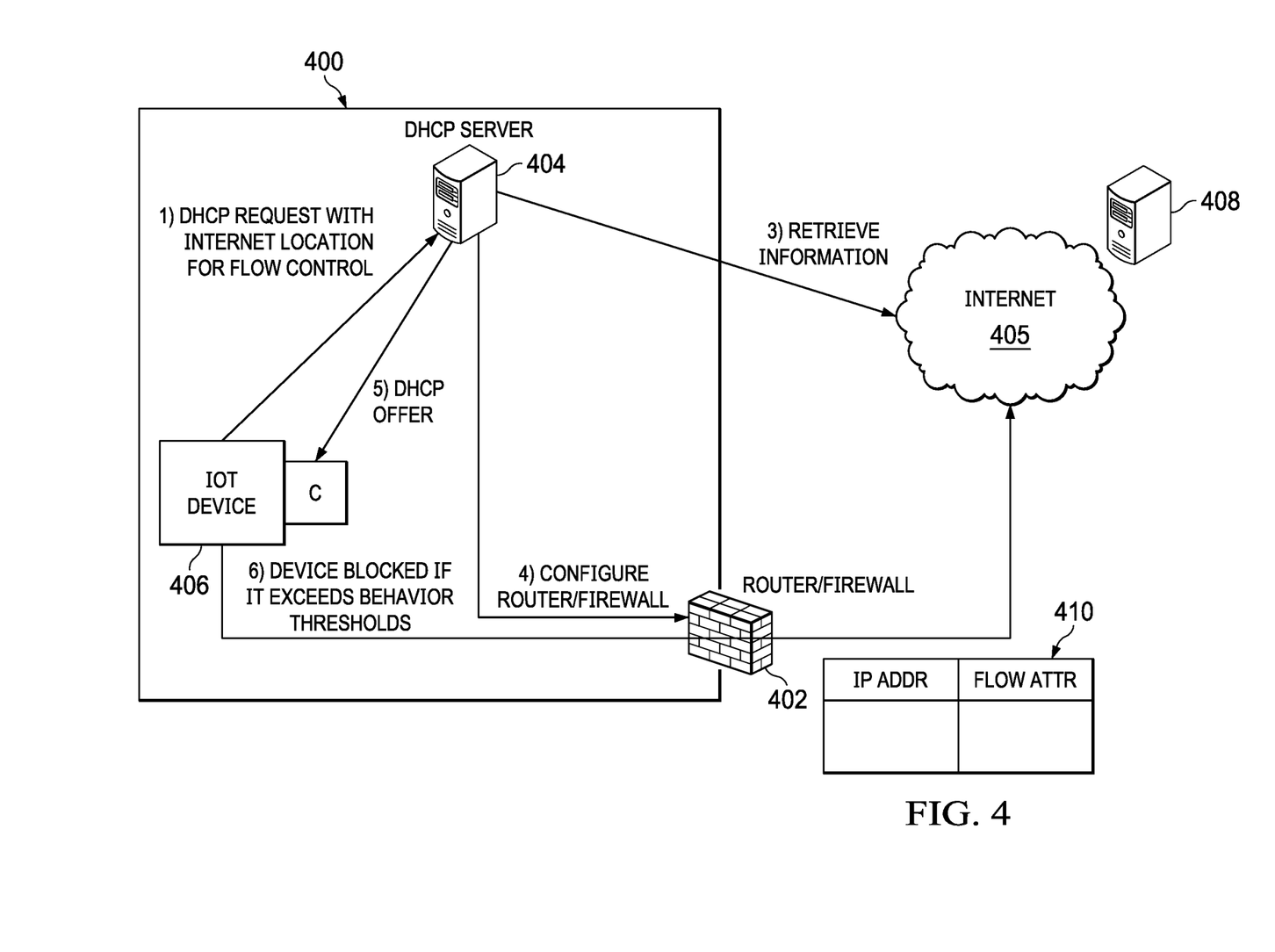
FIG. 4 depicts a representative implementation of the techniques of this disclosure using a DHCP server, and a router.

FIG. 4 depicts the technique of this disclosure in one embodiment involving a network 400 that comprises a network control device 402, and a DHCP server 404. A representative network is a home or small office network, but this is not a limitation. In this example, the network control device 402 is a router or a firewall. The network control device is sometimes referred to as a network boundary control system (NBCS). A network control device of this type facilitates the egress of data packets from the network 400, as well their ingress into the network. Other NBCS types in which the techniques may be practiced in whole or in part include: a gateway, a switch, a proxy, an Intrusion Protection System (IPS) or Intrusion Detection System (IDS), an antivirus system, or some other such device, program, process, or functionality.

Irrespective of how it is implemented, the network control device is configured to store and manage the IP addresses of the devices within the network 400, wherein at least some of those IP addresses are those that have been assigned by the DHCP server 404. In this embodiment, one or more IoT devices are associated with the network, and these devices include IoT device 406 as shown. As also depicted, the network control device 402 couples the network 400 to the publicly-routed Internet 405.

According to this disclosure, the network control device 402 also includes or has associated therewith memory or data storage at which additional information about an IoT device 406 can be stored. To this end, preferably the network control device herein includes an in-memory data table 410 that associates a particular IP address (obtained from the DHCP server 404) with information about the IoT device (e.g., IoT device 406) that has been assigned that IP address during a DHCP message exchange. As will be described below, the information preferably comprises at least the flow attributes for the IoT device.

FIG. 4 depicts a preferred technique for setting up and managing an IoT device 406 according to this disclosure.

A preferred operation begins at step (1) with the IoT device 406 connected to the network 400 and issuing a DHCP discover message to the DHCP server 404. The discover request includes a custom DHCP option that comprises a device identification string, and an Internet location 408. The Internet location 408 is a source of information about the IoT device 406 and, in particular, the IoT device's anticipated network behavior and flows. As described above, the information preferably includes the flow attributes for the device, as well as other data such as a length of time that the attributes (or any of them) are to be valid, the manufacturer's identity, and the like. As noted above, the source of such information may be the vendor or other supplier of the IoT device, an industry or other source of such data, a "trusted" third party source of such data, or the like. Generalizing, the information, typically in the form of a set of one or more flow attributes, represents a behavioral profile for the IoT device. It includes a list of one or more valid behaviors for the device, typically as are or would be expected to be defined by the device manufacturer. In particular, these network behaviors and flows that comprise the information represent an "acceptable" or "expected" or "normal" behavior of the IoT device during its conventional or anticipated use. An IoT device that has been or may be compromised deviates from or operates outside of this behavioral profile in whole or in part, or to some identifiable degree. As noted, a goal of the technique herein is to monitor the IoT device's operation against the vendor's predefined profile to identify when that deviation occurs or may occur, and to take an appropriate action to address the potential or actual security exposure presented by the IoT device that is operating in this manner.

To that end, at step (2), the DHCP server 404 and network control device (e.g., router) 402 perform several operations. The particular operation(s) performed by each of the DHCP or the router depend on how these devices are implemented, i.e., as standalone devices operating on separate systems, or as devices that operate together on the same system. The following describes a typical use case, wherein the DHCP server and the router are distinct (i.e., are not co-located on the same host).

Initially, the DHCP server 404 receives the DHCP discover message and checks local or associated data storage to see if the MAC address from which the request originates has been seen previously. There are several possible outcomes of this check. If the MAC address is already known, the router (or the DHCP server) compares the received DHCP option (in the request) with any DHCP option that has previously stored in association with the MAC address. If the DHCP options match, the routine continues at step (3) described below. If, however, the MAC address is known but the DHCP options do not match, this may indicate a compromised device; thus, the router 406 or the DHCP server 404 takes a predetermined or configured action, such as issuing an alert that the device identification string has changed, issuing an alert and blocking the device from communicating with the Internet, or perhaps simply logging the occurrence (and potentially ignoring the error). If the MAC address is unknown, the router optionally alerts a network administrator that a new IOT device has been detected, and it optionally waits for approval before allowing the device to communicate with the Internet. The process then continues at step (3).

At step (3), the DHCP server 404 contacts the Internet location 408 and receives the IoT behavioral profile embodied in the set of flow attributes, which as noted above typically is a list of one or more valid behaviors for the device, as well as the amount of time such information should be cached. At step (4), the DHCP server 404 communicates with the router 406 to associate the flow attributes received in step (3) with the IP address the DHCP server 404 assigned to the IOT device. Step (4) typically involves adding an entry to the database table 410 that associated the flow attributes with the assigned IP address. At step (5), the DHCP server and the IoT device 406 complete the normal DHCP message exchange. To that end, the DHCP server (having reserved an IP address for the IoT client) makes the lease offer for the IP address reserved; in response, the IoT client replies with the request message formally requesting that IP address, and thereafter the sends back the acknowledgement message. This completes the IP address assignment that was initiated by the DHCP discover message. The network control device now has in place (e.g., in the in-memory data table 410) the information needed to monitor the IoT device. As communication flows (egress and/or ingress) are received at the network control devices, those flows are compared with the information in the data table to determine whether any anomaly exists that might indicate a compromise or attempted compromise of the IoT device. As just one example scenario, if the flow attributes for IoT device 406 at IP address a.b.c.d include an anticipated message sequence (e.g., send 2 TCP messages, receive 3, send 2, receive 1) whereas the network control device recognizes a deviation of this sequence, the network control device can then take an action in response. Thus, and at step (6), because the IoT device has been found to violate the anticipated message sequence (or, more generally, some predefined behavior or behavior threshold), the router 406 warns and/or blocks communications, per its configuration.

The warning or block may be implemented one-time, continuously, on a communication flow-basis, for a particular session, or according to some other constraint or security policy. The particular action taken also may vary depending on one or more factors, such as the nature of the anomaly, a time-of-day, a source or target of the communication flow to/from the IoT device, and the like.

Of course, the particular configuration for a particular IoT device implemented by the IoT guard may vary. The technique herein (whereby the DHCP server knows where to find the particular flow attributes and how to instantiate them on the network control device) provides for customizing the IoT guard per IoT device, IoT device type, or by manufacturer, etc. This approach thus provides for fine-grained protection of the network against actual or potential IoT device compromise. With the IoT guard implemented as has been described, the IoT device cannot be (or continue to be) used as an attack vector.

The particular way in which the alerting or mitigation functionality may be carried out also may vary depending on how the DHCP server and NBCS are implemented. In the embodiment described above with those devices running on separate hosts, the network control device is a router that is configured programmatically (e.g., via a Universal Plug and Play (UPNP) protocol) to alert and/or block. In the alternative, and when those devices are co-located on the same host system, the alert and/or block functions are implemented via direct communication between the router and the DHCP server, in which the DHCP server itself is configured with options to alert, block, log or ignore (e.g., when an IoT device identification string or an IoT device-issued REST API string changes). Irrespective of how the DHCP server and network control device are implemented, preferably the IoT device is configured (e.g., by the manufacturer) to provide a valid REST API as part of the DHCP message exchange (e.g., a discover request) to point to the manufacturer's list of valid network behaviors for the device.

While obtaining the flow attributes during the DHCP discover message processing is preferred, this is not a limitation. The flow attributes may be obtained during other portions of the message exchange, or even before that exchange. Further, the approach of obtaining and instantiating the network flow attributes for the IoT device may be carried during or in association with other network management operations.

There may be configurations in which the DHCP server may decline to provide an address if the IoT guard option is not supplied with a valid URL whose content matches some validation requirements. This might be the case, for example, for users who have a separate subnet only for IoT devices but that still want to ensure that all of the devices participate in the guard service as described herein.

The approach as described above provides significant advantages. It enables robust and fine-grained management and control over IoT devices based on their "normal" or expected (anticipated) behavior in the computing environment in which they are actually implemented. The approach provides for seamless and automated on-boarding of the IoT guard system by leveraging existing protocol interactions that the IoT device otherwise uses in its normal operation. The guard system then uses the manufacturer-supplied network flow characteristics to monitor the IoT device, thereby further protecting the network and its other resource from attack should a malicious attack seek to use the IoT device as an attack vector.

As noted above, it is not required that the technique be implemented in any type of network boundary control system, or that it be implemented in association with a particular NBCS. Alternatively, the technique described herein (e.g., obtaining and enforcing network flow rules) may be implemented in whole or in part as-a-service. Further, the subject matter may be implemented within or in association with a data center that provides cloud-based computing, data storage or related services.

As noted above, the approach herein is designed to be implemented in an automated manner within or in association with a network boundary control system, or any other type of security system, such as a SIEM.

A typical but non-limiting implementation of the technique herein is as a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques herein are implemented in whole or in part in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., NBCS and related network security systems.

The particular IoT devices that are monitored according to the techniques herein are not limited. Any IoT device as currently configured or that may be provided in the future may take advantage of the described techniques.

The nomenclature of a "set of flow attributes" for an IoT device should not be taken by way of limitation either. The attributes may be implemented as a model, a set of data, a data structure, a linked set of data points, or the like, with or without temporal association. For additional security, the data set may be further processed (e.g., by hashing or the like) to protect the information details.

Of course, the information including the set of flow attributes of course may vary over time and thus may be reflected in how the IoT guard system configures the network control device. Thus, the information may change for any number of reasons, e.g., upon a firmware update by the manufacturer, based on new discoveries by the manufacturer or others about proper and improper behavior, and so forth. In one example scenario, the manufacturer supplies updated behavior information from its web site (e.g., version 1 has a first behavior, version 2 has a second behavior, and so forth) at any time, periodically, upon a given occurrence, and so forth. Such updated information is then used by the IoT guard system in accordance with the techniques described herein.

Having described the invention, what we claim is as follows.

We claim:

1. A method of protecting a network that includes a network control device, comprising:
   during a network management protocol lease acquisition message exchange:
      receiving a message from an Internet of Things (IoT) device, the message including a network location storing a set of flow attributes for the IoT device, the set of flow attributes defined by a supplier as a normal behavior of the IoT device;
      responsive to receipt of the message, issuing a query to the network location;
      in response to the query, receiving information including the set of flow attributes;
      responsive to receipt of the information, configuring the network control device to monitor a network behavior of the IoT device by associating at least a portion of the information with a network address associated with the IoT device; and
      monitoring a network communication associated with the IoT device using the information.

2. The method as described in claim 1 wherein the network management protocol is a Dynamic Host Configuration Protocol (DHCP) and the message is a DHCP discover message that has been extended with a custom DHCP option to include the network location.

3. The method as described in claim 2 wherein the network address is an Internet Protocol (IP) assigned to the IoT device in response to the DHCP discover message.

4. The method as described in claim 1 further including:
   determining whether the network communication is consistent with a network flow as defined in the information; and
   upon a determination that the network communication is not consistent with the network flow, taking a given action.

5. The method as described in claim 4 wherein the given action is one of: issuing a notification, blocking an operation of the IoT device, logging the determination, and ignoring the network communication.

6. The method as described in claim 1 wherein the message includes a DHCP option comprising the network location that is an Internet location, and a device identification string that identifies the IoT device.

7. The method as described in claim 6 further including:
   determining whether the message originates from a known MAC address;

when the message originates from a known MAC address and the DHCP option matches a previously-stored DHCP option for the MAC address, issuing the query to the network location;

when the message originates from the known MAC and the DHCP option does not match a previously-stored DHCP option for the MAC address, taking the given action;

when the message does not originate from a known MAC address, alerting that a new IoT device has been detected and waiting for a response before issuing the query to the network location.

8. The method as described in claim 1 further including caching the information for a time period as identified in the information.

* * * * *